2 Sheets--Sheet 2.

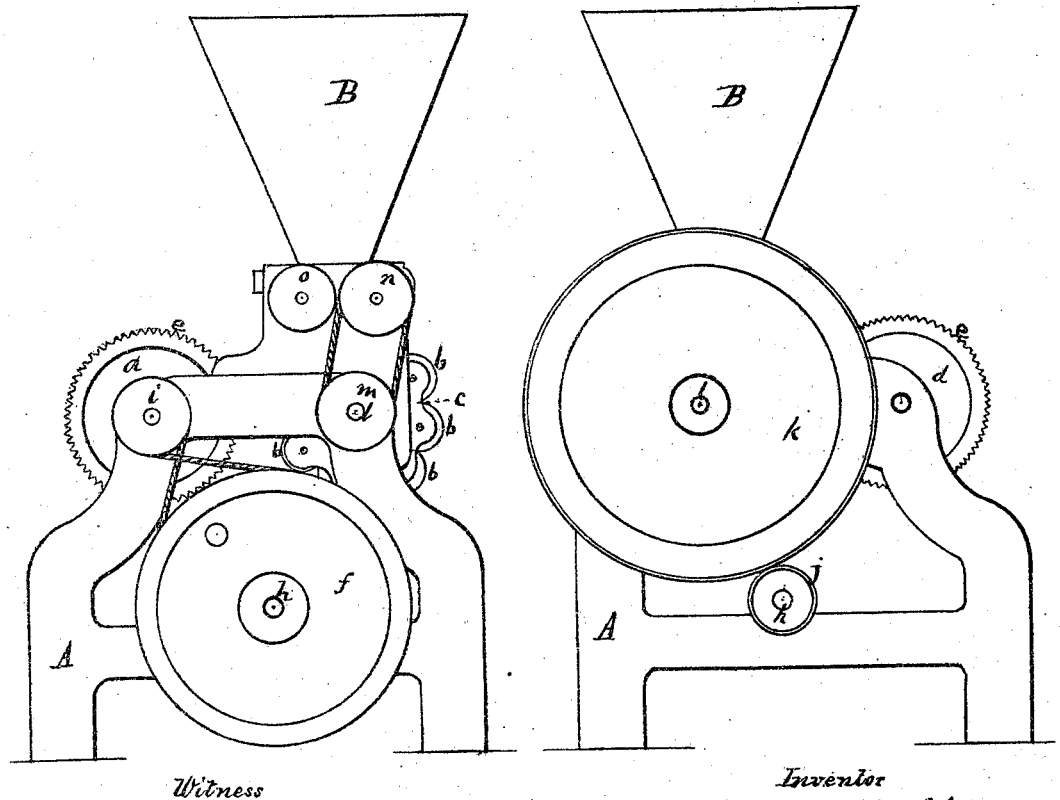

JOHN E. COFFIN.
Machine for Cutting Cop Tubes.

No. 122,362.

Patented Jan. 2, 1872.

Witness
Wm Henry Clifford
Henry C. Houston.

Inventor
John E. Coffin

122,362

UNITED STATES PATENT OFFICE.

JOHN E. COFFIN, OF PORTLAND, MAINE.

IMPROVEMENT IN COP-TUBES AND MACHINES FOR MAKING THEM.

Specification forming part of Letters Patent No. 122,362, dated January 2, 1872; antedated December 23, 1871.

*To all whom it may concern:*

Be it known that I, JOHN E. COFFIN, of Portland, in the county of Cumberland and State of Maine, have invented a new and useful Improved Machine for Cutting Cop-Tubes; and I do hereby declare the following to be a full, clear, and exact description of the same, which will enable others to make and use my invention, reference being had to the accompanying drawing forming part of this specification, in which—

Figure 1:
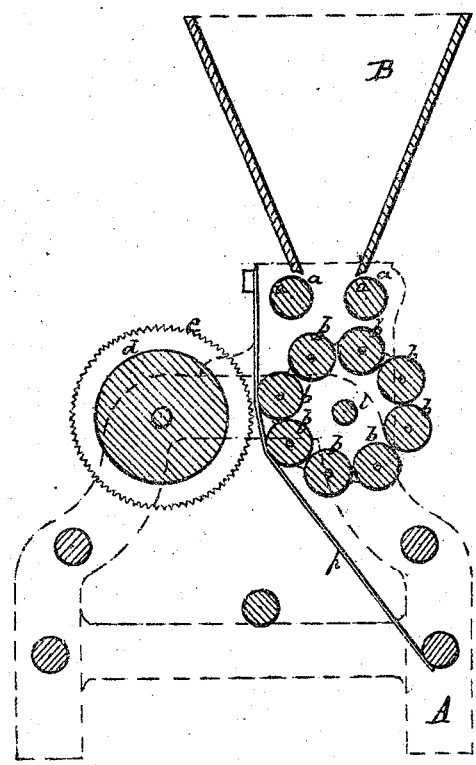
Figure 2:
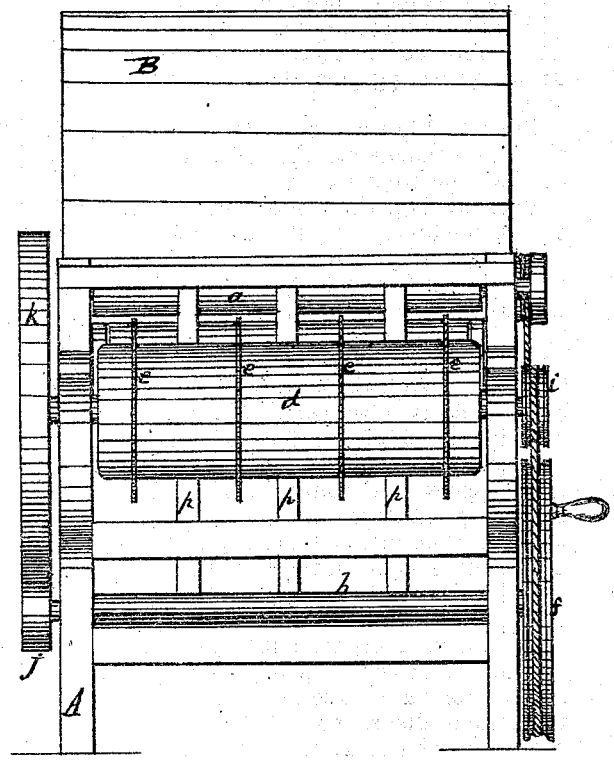

Plate 1: Figure 1 is a side elevation of one side of my machine. Fig. 2 is a side elevation of the opposite side.

Plate 2: Fig. 1 is a side sectional elevation of the machine. Fig. 2 is a front view.

The general purpose of my machine is to cut cop-tubes into the lengths in which they are now used on the spindle. It is customary now to make these tubes in some instances a foot or two long, as they can thus be more economically made, and then to cut them into the desired lengths afterward. My invention consists in a machine for thus cutting the tubes with great rapidity, perfect regularity, and so as to throw the "burr" inside—that is, the slight ragged edge made by the cutting up of the long tube into several short ones. This is by a management of the tube thrown entirely onto the inner periphery of the cop-tube. I also make the machine self-feeding.

The parts of my machine may be thus designated: A frame, A, or support; a hopper, B; feeding-rolls $a$ $a$; a series of small rolls, $b$, set in circular disks $c$ so as to revolve freely on their own shafts at the same time that the whole set revolve with the disks $c$; and a rotating shaft, $d$, with saws $e$ set at intervals to correspond with the desired length of the cop-tubes.

Motion is derived as follows: A large wheel, $f$, on the shaft $h$, extending from one to the other side of the frame A, carries a band over the truck $i$ rigidly set on the saw-shaft $d$. On the other end of the shaft $h$ is a friction-pulley, $j$, in contact with a large pulley, $k$, on the shaft $l$, by which the disks $c$, with their rolls $b$, are rotated. From the truck $m$ on the other end of the shaft $l$ extends a band to the truck $n$ on the same shaft as one of the feeding-rolls $a$, and thus rotates this roll, which, by reason of the truck $n$ being in contact with the truck $o$ on the end of the other feeding-roll $a$, rotates it also. The rotation of the rolls $b$ is occasioned by their bearing against the rubber strips $p$ passing around a portion of the periphery of the rolls, as seen in Fig. 1, Plate 2, and secured as shown. The movement of the rolls $a$ $a$ $b$ $b$ is intended to be slow, while great speed is imparted to the saw-shaft $d$.

The tubes, after being rolled, are placed lengthwise in the hopper B. By the rotation of the two feed-rolls $a$ the long tubes are drawn down onto the set of small rolls $b$, and each long tube drops in the slight groove between two contiguous rolls, and is then carried around and downward, passing under the rubber bands $p$. The bands being fixed the friction of the long tubes against them gives the tubes a rotation on their own axes; and so before they pass down and beyond the saws each tube has made one rotation, and in being sawed the burr is thrown inward or onto the inner periphery of the tube. The cop-tubes are in length the distance between the saws $e$. When the tubes reach the lower part of the circle formed by the rolls $b$ they drop down as soon as released by the bands $p$. A receptacle may be provided for them.

Thus the machine is self-feeding after the tubes are placed in the hopper B.

What I claim as my invention, and desire to secure by Letters Patent, is—

1. The combination of the saw-shaft $d$ with its saws $e$ with the rollers $b$ and straps $p$, arranged as set forth, for the purposes described.

2. The combination of the hopper B, feeding-rolls $a$ $a$, with the disks $c$ and rollers $b$, as set forth.

3. The cop-tube having a burr on its inner surface, as herein described.

Witnesses:            JOHN E. COFFIN.
  WM. H. CLIFFORD,
  HENRY C. HOUSTON.                (142)